United States Patent Office
3,274,780
Patented Sept. 27, 1966

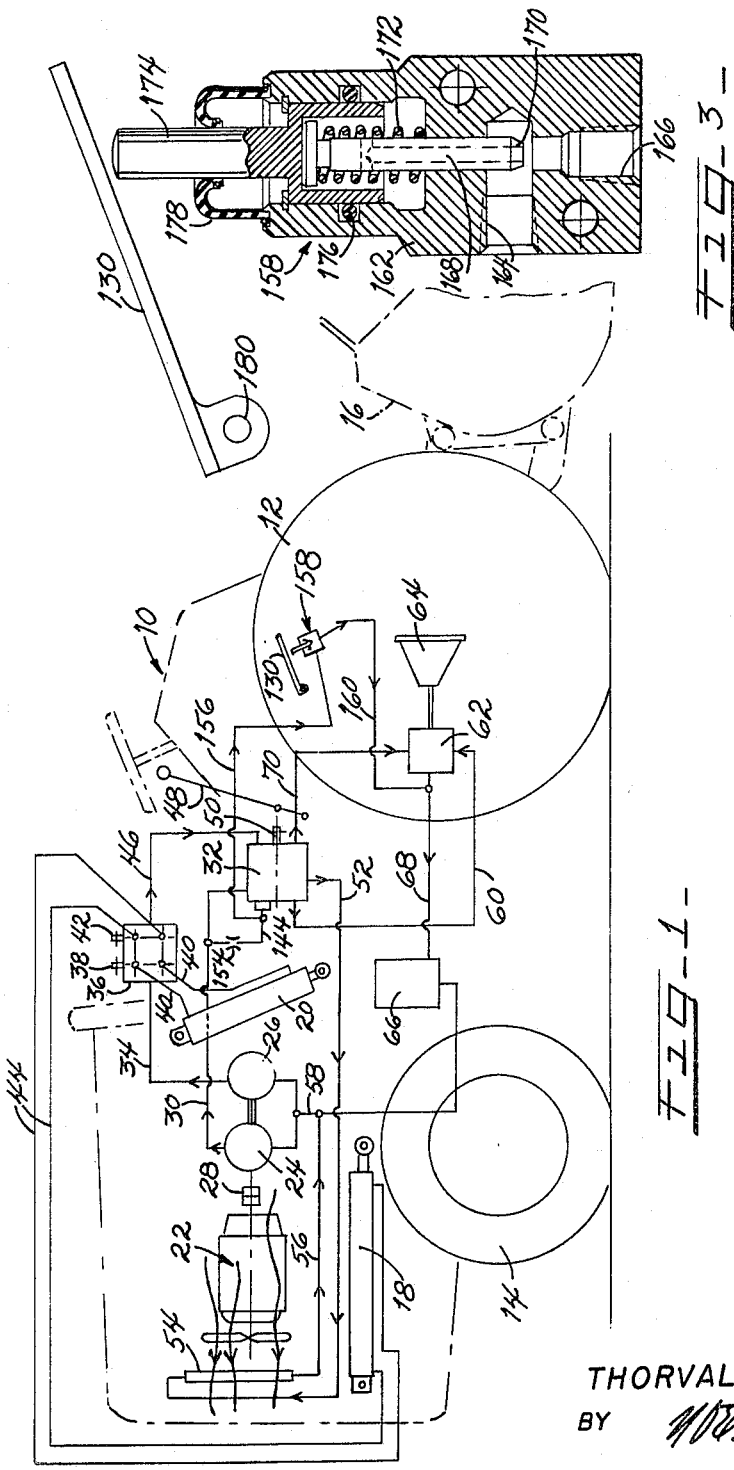

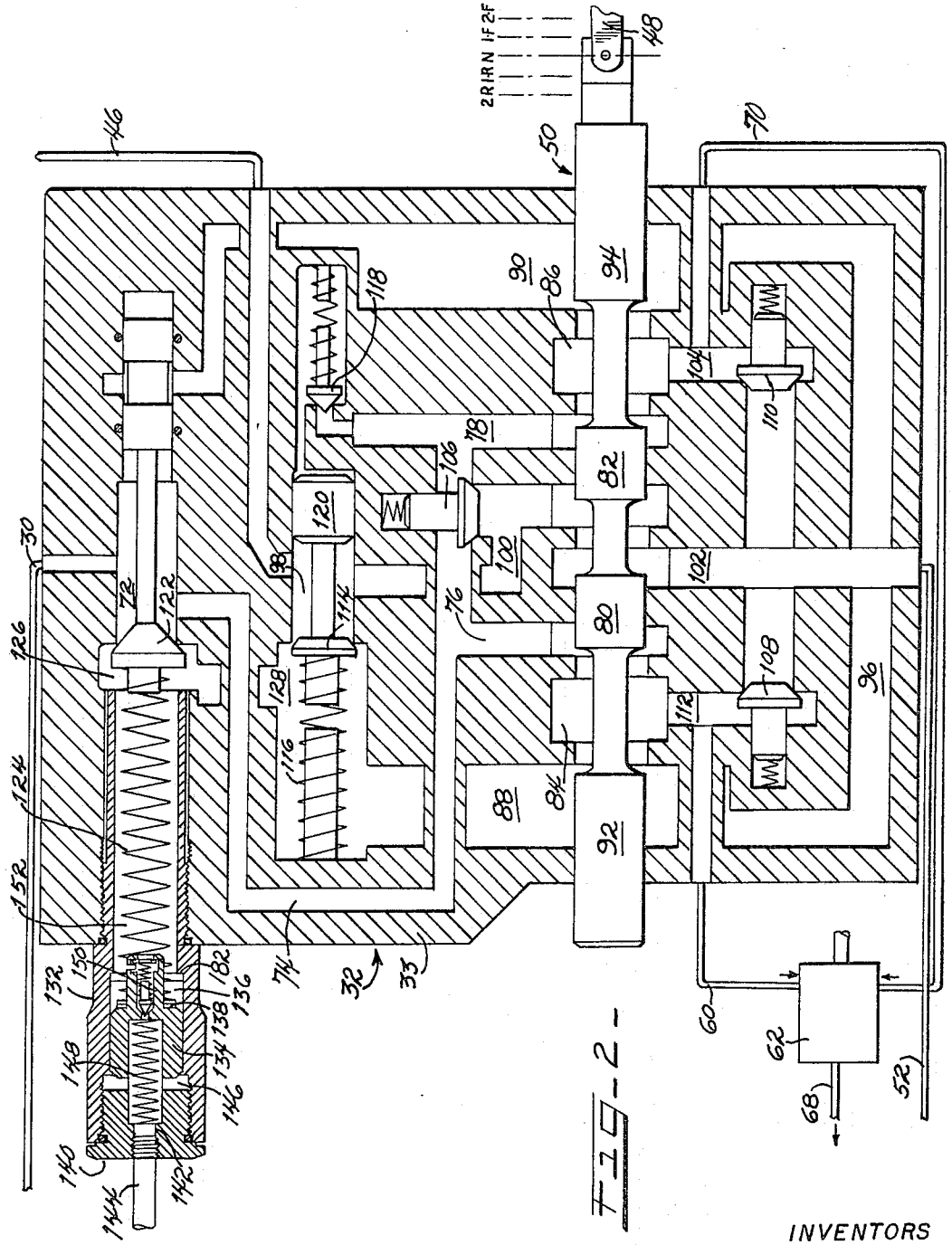

1

3,274,780
CONTROL SYSTEM FOR HYDRAULIC
DRIVE VEHICLES
Karl Salna, Mundelein, and Thorvald G. Granryd, Libertyville, Ill., assignors to International Harvester Company, a corporation of Delaware
Filed Mar. 8, 1965, Ser. No. 437,742
4 Claims. (Cl. 60—53)

This invention relates to vehicles employing a hydraulic drive system and more particularly relates to a hydraulic control device for a vehicle with a substantially constant speed prime mover in which the operator modulates the pressure and flow of fluid to hydraulic motors which drive the tractor wheels.

Vehicles such as tractor loaders which employ hydraulic drive motors such as hydrostatic motors, for example, may be equipped with either internal combustion engines or electric motors as the prime movers. These prime movers drive the hydraulic pumps which supply fluid to the hydraulic motors through appropriate control valves. With an internal combustion engine as the prime mover to flow rate of the fluid, and therefore the vehicle speed, may be conveniently controlled by varying the speed of the prime mover. However, with a constant speed electric motor as the prime mover the fluid flow must be modulated from the source of fluid pressure to control the vehicle speed. This problem is further complicated where an implement on the vehicle such as a loader or fork lift is operated from a separate pump also driven by the prime mover. To obtain maximum utilization of the available horsepower from the prime mover the flow from the loader pump must be combined with the flow from the main pump before delivery to the hydrostatic motors. In control systems which use the main pump flow alone for low-speed operation and which combine both the main pump flow with the loader pump flow for high-speed operation, it is necessary to provide a control which modulates the flow during both modes of operation.

Accordingly, it is an object of this invention to provide a novel control system for a vehicle driven by a hydraulic motor in which the operator modulates the flow of the motor.

It is another object of this invention to provide a control system for a vehicle driven by a hydraulic motor in which the flow from a pair of hydraulic pumps driven by a substantially constant speed prime mover is delivered to the motor under modulating control by the operator.

Another object of this invention is to provide a control system for vehicles incorporating a substantially constant speed prime mover, a pair of hydraulic pumps, and a hydraulic motor in which the full available horsepower of the prime mover may be utilized by combining the flow of both pumps to the motor while modulating the flow of one pump to attain speed control.

Another object is to obtain modulating control of the combined flow from a pair of hydraulic pumps to a hydraulic drive motor by venting the flow from one pump through a valve selectively controlled by the operator.

Yet another object is to provide a novel control system for a vehicle utilizing a hydraulic motor in which the fluid flow to the motors is modulated by selectively varying the relief pressure on a valve in the hydraulic circuit.

The invention, both as to its organization and method of operation, taken with further objects and advantages thereof, will best be understood by reference to the following description, taken in conjunction with the accompanying drawings, in which:

FIGURE 1 is a diagrammatic side elevation view of a front end loader incorporating the hydraulic motor control system embodying features of the present invention;

2

FIGURE 2 is a greatly enlarged cross-sectional side elevation view of a component hydraulic selector valve in the control system of FIGURE 1; and FIGURE 3 is a greatly enlarged cross-sectional side elevation view of the foot-operated control valve in the control system of FIGURE 1.

Referring now to the drawings, and particularly to FIGURE 1, front-end loader vehicle is shown in phantom view at 10. The vehicle includes front traction wheels 12 and rear steerable wheels 14. Any conventional implement, such as loader bucket 16, may be mounted on the vehicle in a well-known manner. Extensible hydraulic rams 18 are mounted on the vehicle to raise and lower the bucket 16 through a pair of boom arms (not shown). Dumping and break-out control of the bucket is achieved through operation of conventional linkages (not shown) which in turn are operated by extensible hydraulic rams 20 mounted on the vehicle.

Power to operate the traction wheels and hydraulic rams is obtained from a prime mover which is preferably a constant speed electric motor 22. Electromotive power for the motor 22 may be supplied through an overhead cable connection (not shown) from an outside source. The motor 22 drives a small element pump 24 and a large element pump 26 through a common drive connection 28. Small element pump 24 delivers fluid at a high pressure and low flow rate through conduit 30 to the directional and range selector valve 32, the operation of which will be presently described. The large element pump 26 will deliver fluid at a low pressure and high flow rate through conduit 34 to loader control valve 36, which may be of a conventional open-center type design.

Appropriate manipulation by the operator of valve spool 38 in loader control valve 36 will direct fluid under pressure to a selected one of the conduits 40 to extend or retract the ram 20. Similarly, manipulation of valve spool 42 will direct hydraulic fluid through a selected one of the conduits 44 to extend and retract hydraulic ram 18 to raise and lower the boom arms. In either the neutral position or any of the operated positions of the valve spools fluid under pressure will be returned through conduit 46 to selector valve 32.

Appropriate manipulation of selector valve lever 48 will operate valve spool 50 of selector valve 32 in a manner described in copending application Serial No. 192,481, filed May 4, 1962, now Patent No. 3,187,497 issued June 8, 1965, by Thorvald G. Granryd, assigned to the same assignee as the present invention. In the neutral position of valve spool 50 fluid will be returned through conduit 52 to air cooled radiator 54 and to conduit 56 for delivery to the suction side of the pumps 24 and 26 through conduit 58. Movement of the valve spool 50 to either of the high or low-speed forward positions will direct fluid under pressure to conduit 60 and to hydrostatic motor 62 for forward drive of the traction wheel 12 through reduction gear box 64. Fluid is returned to reservoir 66 through conduit 68. Similarly, movement of the valve spool 50 to either of the high or low-speed reverse positions will direct hydraulic fluid through conduit 70 to hydrostatic motor 62 for reverse drive of the traction wheel 12.

With valve spool 50 in the neutral position, as shown in FIGURE 2, fluid under pressure from the small element pump is received from conduit 30 while fluid under pressure from the large element pump is received from conduit 46. Fluid from conduit 30 is directed into chamber 72 and into passageways 74, 76 and 78. The valve spool lands 80 and 82 permit fluid communication with chambers 84 and 86 respectively which in turn are in fluid communication with chambers 88 and 90 around the valve spool lands 92 and 94. Chambers 88 and 90 are in fluid communication with passageway 96 which is in fluid communication with conduit 52 for delivery of the fluid to the cooler 54.

Meanwhile fluid received from the large element pump through conduit 46 is directed to chamber 98 which is in fluid communication with chamber 100. The reduced portion between lands 80 and 82 will permit this fluid to flow into chamber 102 for delivery to conduit 52.

For low-speed forward operation of the vehicle selector lever 48 is moved to the right-hand position indicated at 1–F in FIGURE 2. Valve spool 50 will now be positioned so that land 82 closes chamber 78 from communication with chamber 86 while land 92 closes chamber 84 from communication with chamber 88. Chamber 100 will remain in communication with passageway 102. The fluid from the small element pump in chamber 76 is now directed into chamber 84, passageway 112 and conduit 60 for forward operation of hydraulic motor 62, while fluid from the large element pump continues to be recirculated through conduit 52.

With selector lever 48 moved to the right-hand position indicated at 2–F in FIGURE 2 land 80 will now be moved sufficiently to close chamber 100 from communication with passageway 102. Fluid under pressure from the large element pump in chamber 100 will open check valve 106 and be combined with the fluid from the small element pump in passageway 76 for delivery to chamber 84, passageway 112, conduit 60 and hydraulic motor 62. The combined flow from both pumps 24 and 26 will now give high-speed forward drive for hydraulic motor 62.

In a similar manner selector lever 48 may be moved to the left of the neutral position to either the 1–R or 2–R positions for low-speed reverse or high-speed reverse operation respectively. For the low-speed operation fluid from the small element pump 24 is directed by the valve spool 50 into conduit 60 while for high-speed operation the combined flow from both pumps 24 and 26 is directed into conduit 60. Check valves 108 and 110 normally prevent fluid in passageways 104 and 112 from reaching passageway 102, but will open to permit fluid from passageway 102 to flow through either of the conduits 60 or 70 to prevent cavitation of motor 62.

An unloading valve 114 is slidably carried within chamber 98 and is urged by spring 116 to a closed position. The unloading valve 114 permits full utilization of the available horsepower by venting fluid from the large element pump in chamber 98 into chamber 88 at a predetermined pressure, such as 600 p.s.i. This will permit the fluid from the small element pump to build up to its maximum pressure, such as from 2400 to 2500 p.s.i. When the pressure in passageway 78 builds up to the predetermined pressure pilot poppet valve 118 opens to permit fluid to act against piston 120 and thereby move valve 114 to the open position.

A relief valve 122 is slidably carried in chamber 72 and is urged to a closed position by spring 124. Relief valve 122 will operate to vent fluid from the small element pump in chamber 72 into chamber 126 which communicates with chambers 128 and 88. This venting of chamber 72 by valve 122 serves two important purposes, as explained below.

Thus, where the vehicle wheels encounter an obstruction or resistance then pressure will build up in chamber 72 to open valve 122 and thereby vent the small element pump so that the motor 62 is not stalled.

Relief valve 122 also serves as a variable speed control by venting the small element pump in response to the position of the foot-operated control arm 130. This speed control is effective in any of the low or high-speed reverse or forward positions of the selector valve lever. Since fluid from the small element pump 24 is delivered to the hydraulic motor 62 in any of these positions, the pressure and volume of such fluid delivery can be controlled by varying hte pressure setting of relief valve 122.

The cylindrical housing 132 is mounted on valve housing 33 coaxial with spring 124. A piston assembly 134 is slidably carried in bore 136 of housing 132. Shims 138 abut against one end of piston assembly 134 and also abut against the end of spring 124. Cap 140 is threadably received in cylindrical housing 132 and has a passageway 142 to permit fluid communication between conduit 144 and chamber 146. A spring 148 is provided to resiliently urge piston assembly 134 away from cap 140 to maintain the chamber space 146. A poppet valve 150 is also provided in piston assembly 134 to bleed fluid pressure from chamber 146 into chambers 152 and 126.

Referring now to FIGURE 1 it is seen that conduit 144 is in fluid communication with the high pressure fluid from the small element pump 24 in conduit 30. Orifice 154 is provided in conduit 144 to provide low pressure control fluid in chamber 146. Conduit 156 is connected to conduit 144 between orifice 154 and chamber 146. Conduit 156 is in series connection with modulating valve 158, conduit 160 and conduit 68.

Details of the construction of modulating valve 158 are shown in FIGURE 3. Valve housing 162 has an internally threaded bore 164 which is connected with conduit 156. Internally threaded bore 166 communicates with bore 164 and is connected with conduit 160. A plunger 168 is slidably carried in valve housing 162 with the lowered chamfered end 170 moving to and from the internal end of bore 166 to define a variable opening for the fluid flow between bores 164 and 166. Spring 172 urges the plunger of 168 upwardly to the normally open position, as shown in FIGURE 3. The plunger extension 174 abuts against the upper end of plunger 168 and is slidably carried within housing 162. O-ring 176 provides a fluid seal between housing 162 and plunger extension 174. A rubber boot 178 is also provided between the housing 162 and extension 174 to prevent foreign matter from entering the valve assembly. The foot-operated control arm 130 pivots about pin 180 and contacts extension 174 to selectively position the plunger 168 and thereby control the amount of fluid flowing between conduits 156 and 160. Control of the fluid flow in conduit 156 will in turn modulate the control pressure in conduit 144 and chamber 146 (FIGURE 2). This control pressure in chamber 146 will act against piston 134 which in turn will vary the compressive force of spring 124 acting on relief valve 122. The venting of small element pump 124 through relief valve 122 is dependent upon the compressive force of spring 124. Therefore the pressure relief setting of relief valve 122 is modulated by the position of the foot-operated control arm 130.

It is understood that spring 124 may be selected so that a predetermined pressure relief setting is obtained when the pressure in chamber 146 is at a maximum. With the piston 134 moved to the right hand position to abut against the internal shoulder 182 of bore 136, spring 124 will allow relief valve 122 to vent chamber 72 at around 2400 p.s.i. Shims 138 may be added to increase this maximum pressure relief setting at about 100 p.s.i. increments for each shim.

Poppet valve 150 is spring loaded to maintain a control pressure in chamber 146 at about 800 p.s.i. This low control pressure is necessary to insure the smooth operation of any additional devices, such as on-off solenoid valves (not shown), which may be placed in conduit 144.

In operation it is assumed that the selector valve lever 48 is in one of the forward or reverse operating positions so that the small element pump is delivering fluid under pressure to chamber 72. With the operator's foot removed from control arm 130 plunger 168 will be urged to its uppermost position so that valve 158 is normally open. Control fluid will flow through conduit 156 so that the pressure in chamber 146 is at a low value. Piston 134 is thus free to move to the extreme left-hand position permitted by spring 148. The relief valve 122 will therefore vent fluid from chamber 72 at a low value so that no effective pressure is delivered by the small element pump to the motor 62. When the operator moves control arm 130 downwardly plunger 168 limits the fluid flowing through conduit 156, thereby modulating the pressure in chamber 146 to a higher value. Relief valve 122 will in turn vent at a progressively higher relief pressure setting so that fluid will be delivered from the small element pump to the motor 62. With modulating valve 158 in the fully closed position the relief valve 122 will vent only at its maximum pressure setting, and the entire volume of flow from small element pump 24 will be delivered to motor 62. Valve 122 will now vent only when the wheels of the vehicle encounter an obstruction or resistance. By adjusting the position of control arm 130 the control pressure in chamber 146 is modulated from 0 to 800 p.s.i., which in turn modulates the relief valve 122 setting from 0 to 2400 p.s.i.

Thus it is seen that a simple and efficient means has been provided whereby the operator can control the speed of a hydraulic motor type vehicle by modulating the relief pressure setting of a pump delivering fluid to the motor.

It will be understood that various changes in the details, material, steps and arrangement of parts, which have been described and illustrated in order to explain the nature of the invention, may be made by those skilled in the art within the principle and scope of the invention as expressed in the appended claims.

What is claimed is:

1. In a vehicle supported by traction wheels, the combination including: a source of fluid under pressure; at least one hydraulic motor in driving connection with a traction wheel; a conduit connected with the source of fluid under pressure; selector valve means to selectively interconnect the conduit with the hydraulic motor; relief valve means to vent fluid from the conduit including a port in the conduit, a valve movable to a first position closing the port and to a plurality of other positions opening the port responsive to fluid pressure in the conduit, and spring means to urge the valve to the first position with a predetermined force; other means connected to the relief valve means to vary the predetermined force including a fluid chamber, control fluid under pressure in the chamber, and a piston having two ends, one of the ends connected with the spring means urging the valve and the other end slidable in the chamber between first and second positions responsive to the pressure in the chamber, the spring means being effective in any position of the piston to vent fluid from the conduit; and additional means to selectively vary the fluid pressure in the chamber.

2. In a vehicle supported by traction wheels, the combination including: a prime mover mounted on the vehicle; first and second hydraulic pumps in driving connection with the prime mover; the first pump having a first outlet delivering fluid at a certain flow rate, and the second pump having a second outlet delivering fluid at another flow rate larger than said certain flow rate; at least one hydraulic motor in driving connection with a traction wheel; selector valve means to selectively interconnect the first outlet with the motor or the first and second outlets with the motor; relief valve means to vent fluid from the first pump including a port in the first outlet, a valve movable to a first position closing the port and to a second position opening the port responsive to pressure in the first outlet, and spring means connected with the valve to urge the valve to the first position with a predetermined force; and other means to selectively vary the predetermined force including a fluid chamber, and a piston having first and second ends, the first end connected with the spring means and the second end slidable in the chamber to vary the predetermined force responsive to fluid pressure in the chamber, and additional means to selectively vary the fluid pressure in the chamber.

3. In a vehicle supported by traction wheels, the combination including: a prime mover mounted on the vehicle; first and second hydraulic pumps in driving connection with the prime mover; the first pump having a first outlet delivering fluid at a certain flow rate, and the second pump having a second outlet delivering fluid at another flow rate larger than said certain flow rate; at least one hydraulic motor in driving connection with a traction wheel; selector valve means to selectively interconnect the first outlet with the motor or the first and second outlets with the motor; relief valve means to vent fuel fluid from the first pump including a port in the first outlet, a valve movable to a first position closing the port and to a second position opening the port responsive to pressure in the first outlet, and spring means connected with the valve to urge the valve to the first position with a predetermined force; and other means to selectively vary the predetermined force including a fluid chamber, and a piston having first and second ends, the first end connected with the spring means and the second end slidable in the chamber to vary the predetermined force responsive to fluid pressure in the chamber; and additional means to selectively vary the fluid pressure in the chamber including a first conduit interconnecting the first outlet with the chamber, an orifice in the first conduit, a second conduit connected with the first conduit intermediate the orifice and the chamber, and modulating valve means connected with the second conduit to selectively vary the pressure in the chamber.

4. In a vehicle supported by traction wheels, the combination including: a prime mover mounted on the vehicle; pump means in driving connection with the prime mover; the pump means having a first outlet delivering fluid at a certain flow rate and a second outlet delivering fluid at another flow rate larger than said certain flow rate; at least one hydraulic motor in driving connection with a traction wheel; selector valve means movable to a first position from a neutral position to fluidly connect the first outlet with the motor and to a second position from the neutral position to fluidly connect the first and second outlets with the motor; relief valve means to vent fluid from the first outlet including a port in the first outlet, a valve movable to a first position closing the port and to a second position opening the port responsive to pressure in the first outlet, and spring means connected with the valve to urge the valve to the first position with a predetermined force; other means connected to the relief valve means to modulate the amount of fluid vented including a fluid chamber and a piston having first and second ends, the first end connected with the spring means and the second end slidable in the chamber responsive to fluid pressure in the chamber; a control arm on the vehicle; and additional means responsive to the position of the control arm to selectively vary the fluid pressure in the chamber.

References Cited by the Examiner

UNITED STATES PATENTS

| | | | |
|---|---|---|---|
| 2,392,421 | 1/1946 | Stephens | 60—97 X |
| 2,789,542 | 4/1957 | Vander Kaay | 60—53 X |
| 2,874,682 | 2/1959 | Vander Kaay | 60—52 X |
| 2,984,985 | 5/1961 | MacMillin | 60—52 X |

EDGAR W. GEOGHEGAN, *Primary Examiner.*